United States Patent
Langgood et al.

(10) Patent No.: US 7,647,440 B2
(45) Date of Patent: Jan. 12, 2010

(54) MOTHERBOARD DETECTION OF COMPUTER CHASSIS TYPE

(75) Inventors: John K. Langgood, Cary, NC (US); Thomas Francis Lewis, Raleigh, NC (US); Kevin Michael Reinberg, Chapel Hill, NC (US); Kevin Shayne Dwayne Vernon, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 179 days.

(21) Appl. No.: 12/033,554

(22) Filed: Feb. 19, 2008

(65) Prior Publication Data

US 2009/0234995 A1    Sep. 17, 2009

(51) Int. Cl.
    *G06F 13/00*    (2006.01)

(52) U.S. Cl. ...................................... 710/104; 713/100
(58) Field of Classification Search ................ 710/104; 713/100

See application file for complete search history.

(56) References Cited

U.S. PATENT DOCUMENTS

| | | | |
|---|---|---|---|
| 6,137,678 A * | 10/2000 | Gebara et al. .......... | 361/679.31 |
| 6,295,567 B1 * | 9/2001 | Bassman et al. ............ | 710/104 |
| 6,388,574 B1 * | 5/2002 | Davis et al. .............. | 340/568.1 |
| 6,862,188 B2 * | 3/2005 | Calhoon ..................... | 361/752 |
| 2005/0128700 A1 * | 6/2005 | Alperin et al. .............. | 361/687 |
| 2009/0045967 A1 * | 2/2009 | Bandholz et al. ............ | 340/627 |

\* cited by examiner

*Primary Examiner*—Evan Pert
(74) *Attorney, Agent, or Firm*—John L. Rogitz (57) ABSTRACT

A computer motherboard detects the form factor type of the chassis in which it is installed to permit tailoring functionality accordingly.

21 Claims, 7 Drawing Sheets

MOTHERBOARD DETECTION OF COMPUTER CHASSIS TYPE

FIELD OF THE INVENTION

The present invention generally relates to a computer motherboard detecting the form factor type of the chassis in which it is installed to permit tailoring functionality accordingly.

BACKGROUND OF THE INVENTION

In the PC world, it is common for one motherboard assembly to be used in multiple mechanical form factors. For instance, a single motherboard could fit in both a tower and a desktop enclosure. However, the different form factors might have different thermal profiles with different optimal fan speed curves. In addition, one form factor might expose different motherboard I/O than another. Other parameters likewise might vary with form factor.

Simply programming the motherboard's non-volatile memory to account for the form factor in which the motherboard is to be used is less than desirable. First, it locks the motherboard to the form factor that is programmed in memory until and unless the memory is reprogrammed, typically not a chore that end users would welcome. Also, it means that the memory must be programmed correctly, and moreover the location of the form factor type in memory can be accidentally or maliciously erased. Moreover, a replacement motherboard must be updated manually.

SUMMARY OF THE INVENTION

Accordingly, a motherboard (e.g., the basic input-output system (BIOS) of the motherboard) reads the form factor type directly from the chassis in which the motherboard is installed. Among various ways this may be accomplished is by using an elevated chassis mechanical feature or features that contact one or more individual conductive pads or plated-thru holes arrayed on the bottom of the motherboard. These pads/holes are electrically connected through resistors to a DC supply, and are connected to individual general-purpose input ports (GPIOs). The elevated feature or features can conduct one or more pad/holes to chassis ground, and collectively encode a unique chassis type that can be read by BIOS or other system software through the GPIOs. As an alternative to an electro-mechanical detection, electro-optical detection may be used, in which structural features on the chassis interact with light sensors on the motherboard to collectively encode the unique chassis type.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
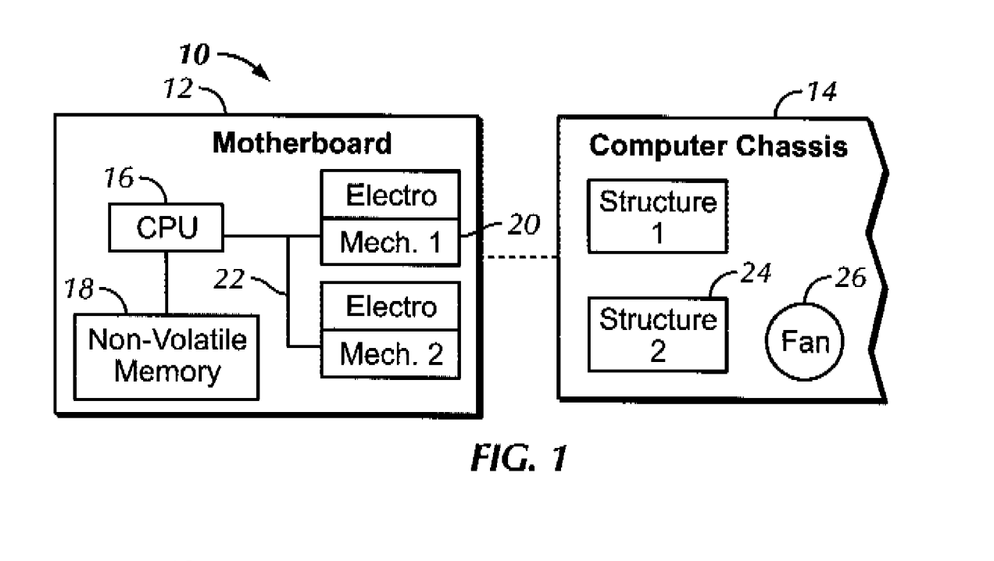
FIG. 1 is a block diagram of one non-limiting implementation in accordance with present principles, illustrating electro-mechanical chassis form factor detection.

Referring initially to FIG. 1, a system is shown, generally designated 10, which includes a flat typically rectilinear computer motherboard 12 and a hollow typically parallelepiped-shaped computer chassis 14 in which the motherboard 12 may be mounted. The motherboard 12 may bear one or more central processing units (CPU) 16 that can access one or more computable-readable media such as but not limited to a non-volatile memory (NVM) 18 to execute present principles. The NVM 18 may store chassis information as well as instructions such as a BIOS that can be executed by the CPU 16.

In the non-limiting embodiment shown in FIG. 1, the motherboard 12 also bears one or more electro-mechanical sensor elements 20 that can communicate with a CPU bus 22. One or more of the elements 20 mate with one or more structures 24 on the chassis 14, with each form factor chassis type being equipped with form factor-unique structures 24. That is, the number and/or chassis locations of the structure(s) 24 are unique to the form factor type of the chassis. This mating or interaction causes signals to be sent to the CPU 16 that indicate the type of chassis form factor with which the motherboard 12 has been engaged. In response, the CPU 16 executing, e.g., BIOS on the NVM 18 can establish a parameter, e.g., the speed of a cooling fan 26 on the chassis 14, as appropriate for the form factor type in which the motherboard 12 finds itself. Various implementations of the sensor elements 20 are discussed further below.

Figure 2:
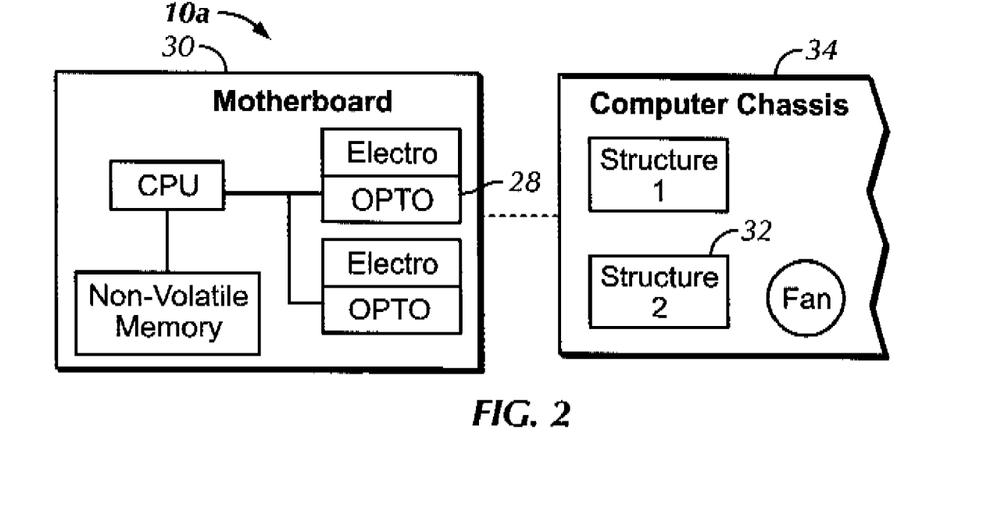
FIG. 2 is a block diagram of another non-limiting implementation in accordance with present principles, illustrating electro-optical chassis form factor detection.

FIG. 2 shows a system 10a that in all essential respects is identical to the system 10 shown in FIG. 1, except that instead of electro-mechanical sensor elements, the system 10a employs electro-optical sensor elements 28 on a motherboard 30 that interact with one or more form factor-unique structure 32 on a computer chassis 34. The elements 28 may be pairs of light emitters (such as but not limited light emitting diodes (LED)) and light detectors (such as but not limited to photoresistors or phototransistors). The emitters emit light onto the structures 32 that may be, without limitation, holes or voids. It will readily be appreciated that the light reflected from the chassis is sensed by the detectors, with the structures 32 being arranged to ensure that the sensor elements 28 sense in combination a reflection pattern that is unique to the form factor of the chassis. The signals from the sensor elements 28 are used in accordance with principles discussed below in the case of signals from electro-mechanical sensor elements.

Figure 17:
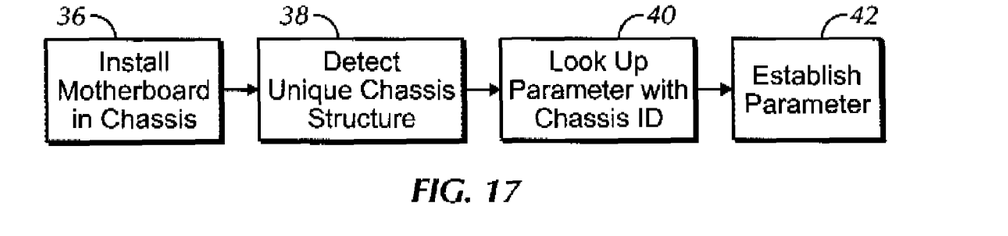
FIG. 17 is a flow chart showing a method that can be used with the structures shown herein.

FIG. 17 shows non-limiting logic in accordance with present principles. At block 36 a motherboard is engaged with a chassis and at block 38 the form factor-unique chassis structure is detected by means of the sensor elements on the motherboard interacting with the form factor-unique chassis structure. The sensor elements provide a signal, functionally a form factor identification, to the motherboard CPU, which may, e.g., execute BIOS to look up or otherwise correlate the signal to one or more parameters at block 40. The parameter(s) are established at block 42, typically by the CPU. Non-limiting examples of parameters that are established include chassis fan speed, and activation or use of a particular type of input/output structure and/or protocol.

Figure 3:
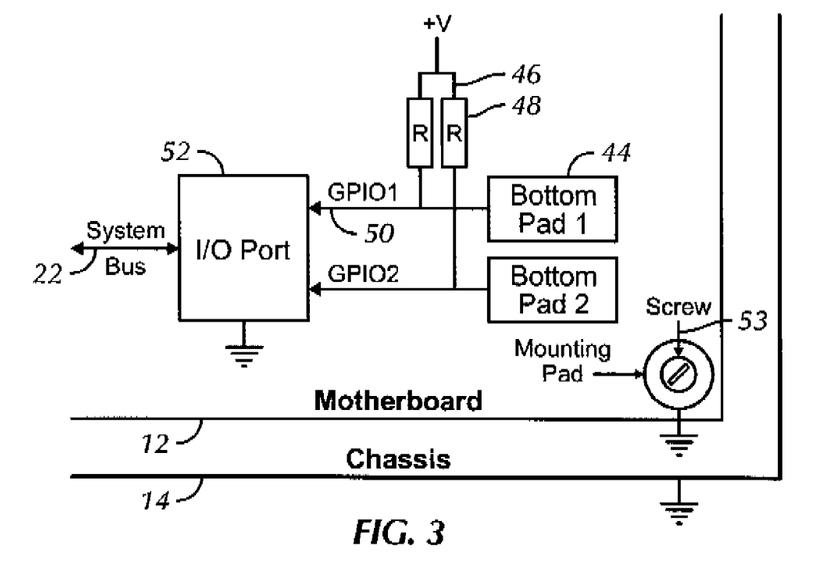
FIG. 3 is a schematic plan view of a first non-limiting embodiment showing contact pads on the motherboard.

FIG. 3 shows an example non-limiting implementation in which electro-mechanical sensor elements on the motherboard 12 are established by electrically conductive contact pads 44 that can be aligned with each other in one flat dimension of the motherboard (looking down on FIG. 3, the Y-dimension) as shown and offset from each other in the other flat dimension (looking down on FIG. 3, the X-dimension). Each pad 44 is connected to a voltage source 46 through a respective resistor 48. Also, each pad 44 is connected to a respective GPIO port 50 of an I/O port assembly 52. The I/O port assembly 52 is connected to the system bus 22 shown in FIG. 1 and, thus, to the CPU 16. One or more screws 53 can engage the motherboard with the chassis.

Figure 4:
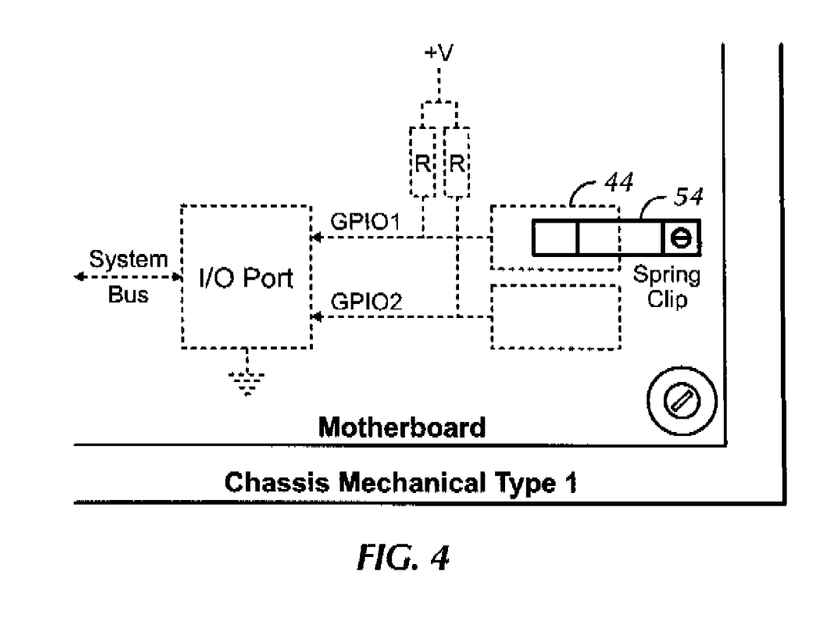
FIG. 4 is a schematic plan view of the first embodiment showing a spring clip on one type of chassis form factor mating with a first one of the contact pads on the motherboard.
Figure 5:
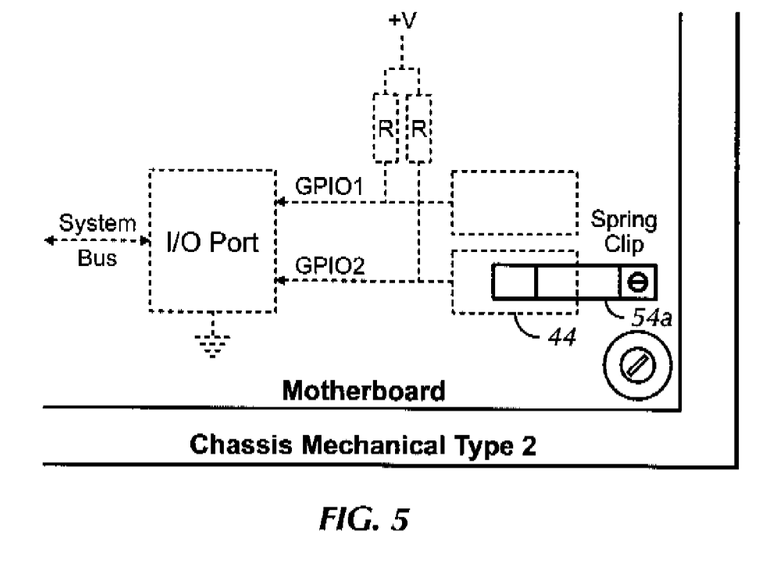
FIG. 5 is a schematic plan view of the first embodiment showing a spring clip on a second type of chassis form factor mating with a second one of the contact pads on the motherboard.

FIGS. 4 and 5 show that the structure of the chassis that engages the sensor elements of the motherboard may be one or more electrically conductive spring clips 54 that wipe against one of the pads. In FIG. 4, the spring clip 54 is on one type of chassis form factor and abuts against the upper contact pad 44 on the motherboard when the motherboard is engaged with the chassis. In contrast, in FIG. 5 a spring clip 54a is arranged on a second type of chassis form factor to mate with the lower contact pad 44 on the motherboard. In one implementation, when a spring clip abuts a contact pad the contact pad is grounded, and otherwise it is not. In this way, the signals generated through the contact pads 44 and sent to the CPU 16 depend on which pad or pads are engaged by spring clips to in effect encode the signal uniquely for the form factor type of the chassis.

Figure 6:
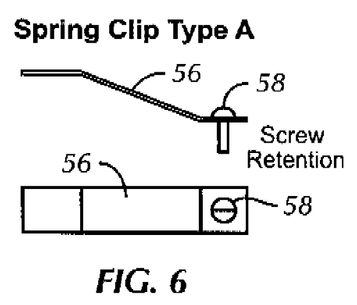
FIGS. 6 and 7 show alternate non-limiting embodiments of spring clips.
Figure 7:
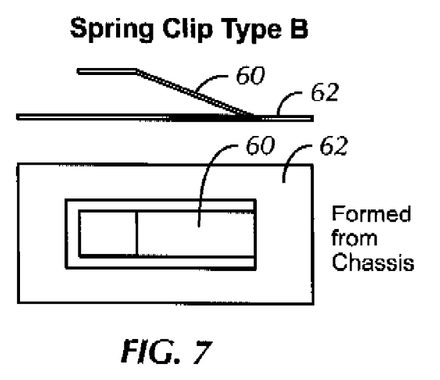
Figure 8:
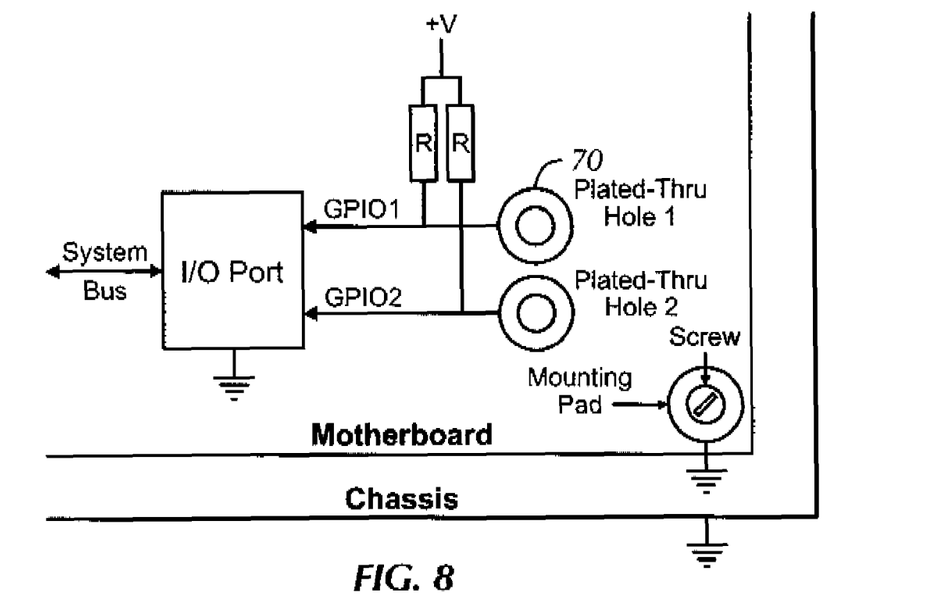
FIG. 8 is a schematic plan view of a second non-limiting embodiment showing plated through holes on the motherboard.

FIG. 6 shows that a spring clip 56 can be connected to the chassis by a mounting screw 58. In another embodiment shown in FIG. 7, a spring clip 60 is formed integrally with a substrate 62 of the chassis by, e.g., cutting material away from three sides of a rectangular opening in the substrate and leaving the fourth side uncut.

Figure 9:
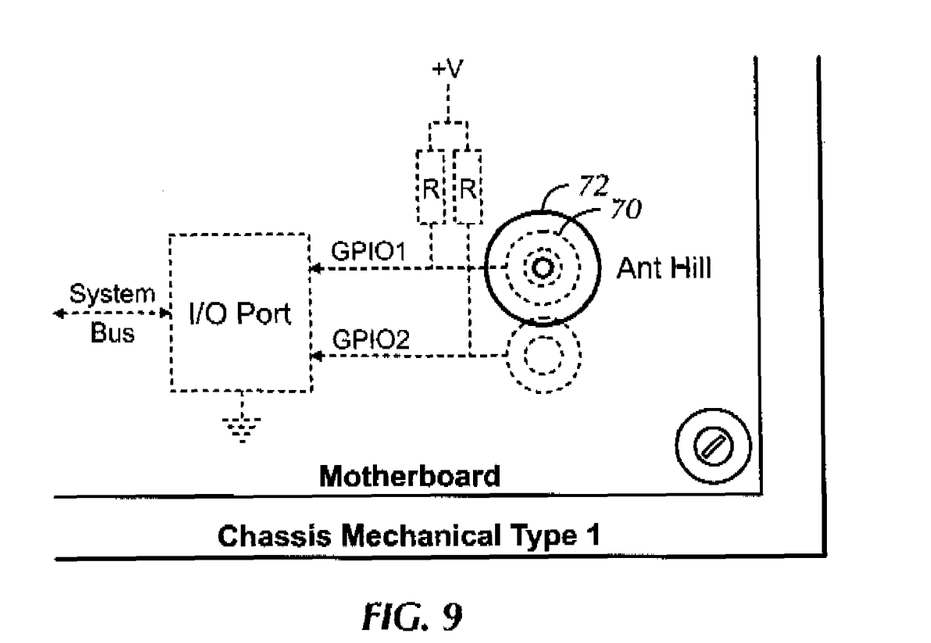
FIG. 9 is a schematic plan view of the second embodiment showing a frustum-like protrusion (colloquially, "ant hill") on one type of chassis form factor mating with a first one of the through holes on the motherboard.
Figure 10:
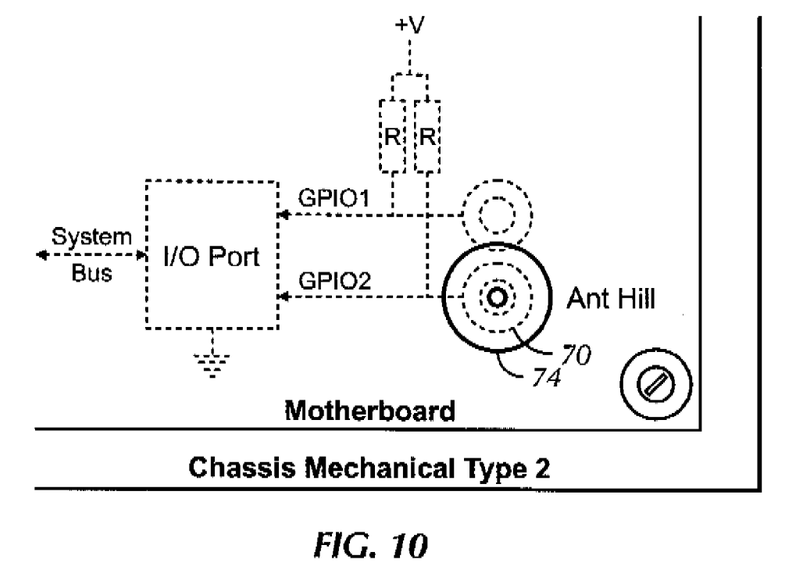
FIG. 10 is a schematic plan view of the second embodiment showing a frustum-like protrusion on a second type of chassis form factor mating with a second one of the through holes on the motherboard.
Figure 11:
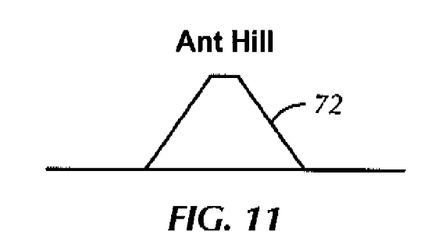
FIG. 11 shows elevational and plan views of one of the chassis protrusions of FIGS. 9 and 10.
Figure 12:
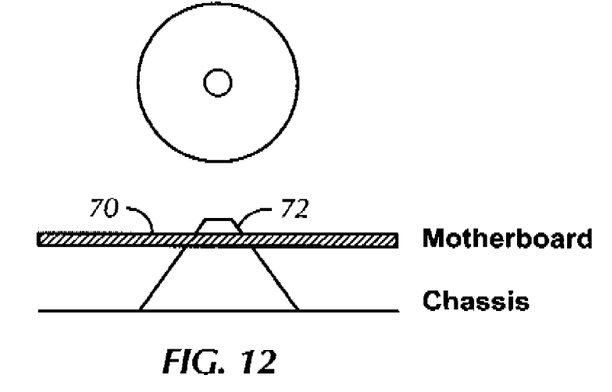
FIG. 12 is an elevational view illustrating the chassis protrusion extending into a motherboard through hole.
Figure 13:
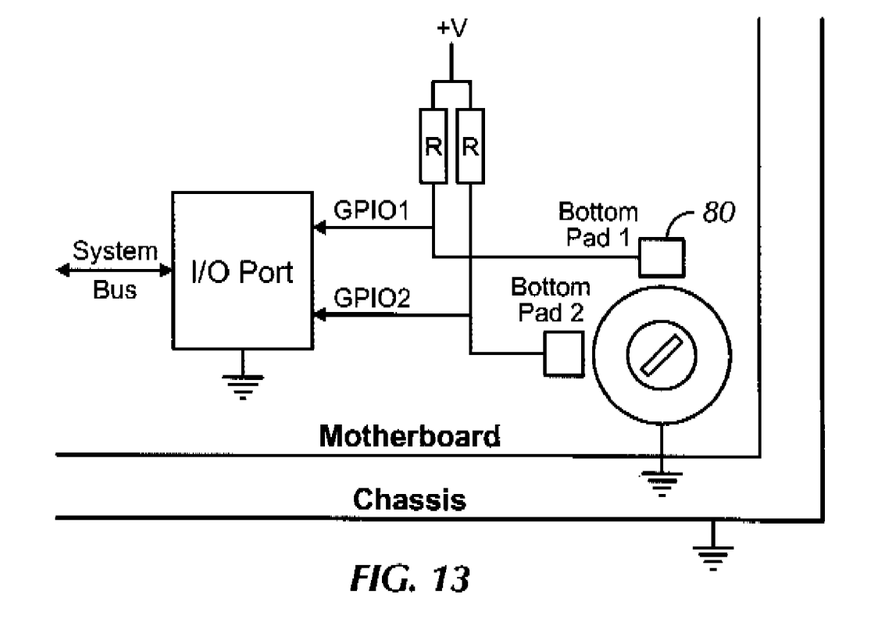
FIG. 13 is a schematic plan view of a third non-limiting embodiment showing pads on the motherboard that are offset from each other in both flat dimensions of the motherboard.

FIGS. 8-12 show another implementation of the electro-mechanical sensor elements, this time established by electroplated through holes 70 in the motherboard that mate with an electrically conductive frusto-conical protrusion 72 (colloquially, "ant hill") on the chassis. In FIG. 9, a protrusion 72 on a first type of form factor protrudes partially through the upper hole 70, grounding it, while in FIG. 10 a protrusion 74 on a second type of form factor protrudes partially through the lower hole 70, grounding it. The frusto-conical shape of the ant hill 72 is shown in FIG. 11, and in FIG. 12 the upper part of the protrusion 72 is shown extending through the hole 70 such that the sides of the protrusion 72 abut the plated sides of the hole 70.

Figure 14:
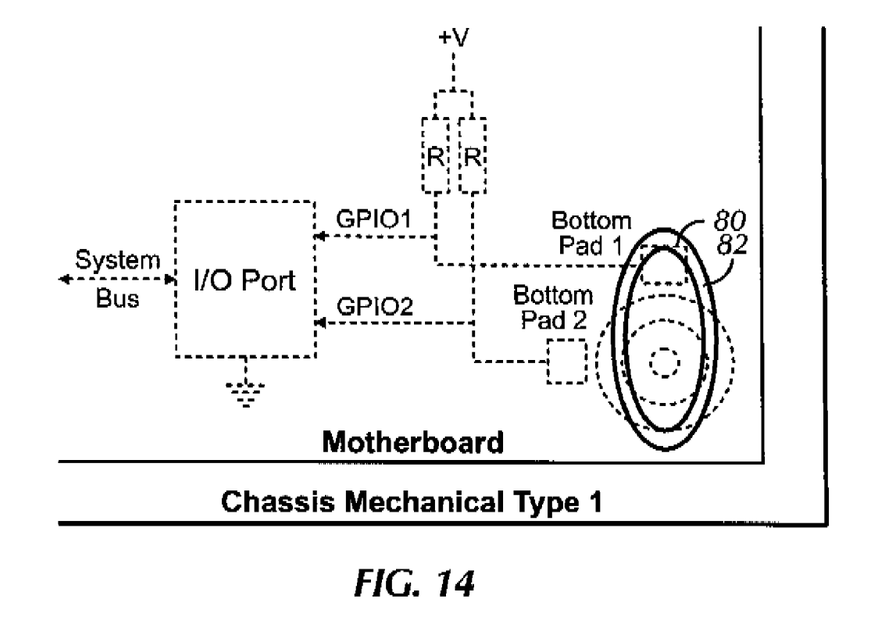
FIG. 14 is a schematic plan view of the third embodiment showing an oblong extension to the motherboard-chassis screw mount mating with a first one of the pads on the motherboard.
Figure 15:
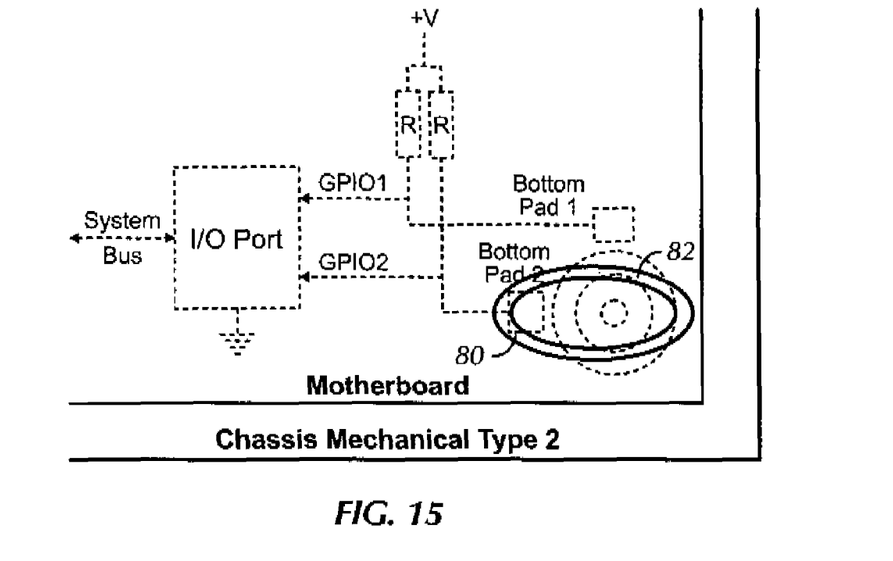
FIG. 15 is a schematic plan view of the third embodiment showing an oblong extension to the motherboard-chassis screw mount mating with a second one of the pads on the motherboard.
Figure 16:
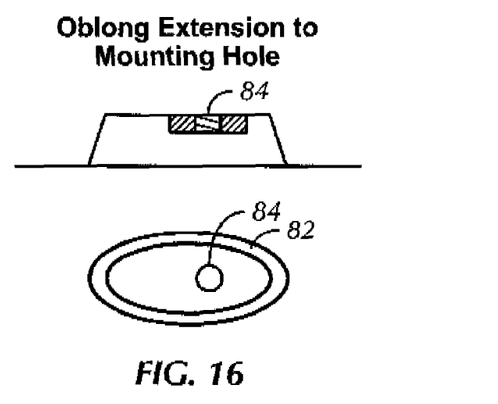
FIG. 16 shows elevational and plan views of one of the extensions of FIGS. 14 and 15.

FIGS. 13-16 show yet another implementation of the electro-mechanical sensor elements, this time established by pads 80 on the motherboard that are offset from each other in both flat dimensions of the motherboard, one of which mates with an electrically conductive non-round extension 82 that may be oriented as appropriate for the form factor type of the chassis by engaging the mounting screw 84 with the extension. In the embodiment shown, the extension may be oblong or ovular or elliptical or otherwise not circular, so that depending on its orientation it can contact only one of the pads 80 at a time. In FIG. 14 the extension 82 is oriented to contact the upper right pad 80 to indicate a first type of form factor whereas in FIG. 15 the extension 82 is oriented to contact the lower left pad 80 to indicate a second type of form factor. FIG. 16 shows two views of the extension 82.

It may now be appreciated that for each chassis form factor, the location and/or orientation of the chassis structures are fixed relative to the pad/hole array of the motherboard. Only those elevated features required to encode the chassis type for that particular chassis are required to be implemented. The feature(s) could be implemented with a spring clip, ant-hill, or oblong extension to an existing mounting hole ant-hill. Spring clips can mate with motherboard pads, while ant-hill or ant-hill extensions can mate with motherboard plated-thru holes. The ant-hill or extension can rise to an elevation just above the bottom surface of the mounted motherboard, such that the top of the hill can make contact by pressing against the inner diameter of the plated-thru hole. The chassis form factor type may be encoded in binary across multiple elevated features, or each chassis type can claim one unique feature. Using the spring clip method, a single common spring clip can be used across multiple chassis types, with each chassis locating the spring clip to match a different pad in the array.

While the particular MOTHERBOARD DETECTION OF COMPUTER CHASSIS TYPE is herein shown and described in detail, it is to be understood that the subject matter which is encompassed by the present invention is limited only by the claims.

What is claimed is:

1. A computer motherboard comprising:
    at least one sensor element interacting with structure on a computer chassis in which the motherboard is installed, the chassis having a form factor; and
    at least one central processing unit (CPU) receiving signals from the at least one sensor element and correlating the signals to at least one parameter that is dependent on the form factor of the chassis, the parameter being a functional parameter, wherein the sensor element is an electro-optical sensor element that optically interacts with structure on the chassis.

2. A computer motherboard comprising:
    at least one sensor element interacting with structure on a computer chassis in which the motherboard is installed, the chassis having a form factor; and at least one central processing unit (CPU) receiving signals from the at least one sensor element and correlating the signals to at least one parameter that is dependent on the form factor of the chassis, the parameter being a functional parameter, wherein the sensor element is an electro-mechanical sensor element that mechanically interacts with structure on the chassis and further wherein the element is at least one plated through hole.

3. The motherboard of claim 2, wherein the structure on the chassis is at least one frustum-like protrusion that can extend into the through hole.

4. A computer motherboard comprising:
at least one sensor element interacting with structure on a computer chassis in which the motherboard is installed, the chassis having a form factor; and
at least one central processing unit (CPU) receiving signals from the at least one sensor element and correlating the signals to at least one parameter that is dependent on the form factor of the chassis, the parameter being a functional parameter, wherein the sensor element is an electro-mechanical sensor element that mechanically interacts with structure on the chassis and further wherein the element is at least two pads that are offset from each other in both flat dimensions of the motherboard.

5. The motherboard of claim 4, wherein the structure on the chassis is at least one oblong extension that wipes against one and only one of the pads.

6. A method, comprising:
generating a form factor-unique signal in response to a motherboard being coupled to a computer chassis having a form factor; and
at least partially in response to the signal, establishing at least one operating parameter of a computer, the signal being generated by at least two pads that are offset from each other in both flat dimensions of the motherboard and that interact with structure on the chassis.

7. The method of claim 6, wherein the computer is established at least in part by the motherboard and chassis.

8. A method. comprising:
generating a form factor-unique signal in response to a motherboard being coupled to a computer chassis having a form factor; and
at least partially in response to the signal, establishing at least one operating parameter of a computer, wherein the signal is generated in response to at least one optical interaction between the motherboard and chassis.

9. The method of claim 6, wherein the signal is generated in response to at least one mechanical interaction between the motherboard and chassis.

10. The method of Claim 6, wherein the parameter is a fan speed.

11. The method of claim 6, wherein the parameter is a particular type of input/output structure and/or protocol.

12. A tangible computer readable medium bearing instructions executable by a processor for:
establishing at least one form factor-dependent operating parameter in a computer having a chassis and a motherboard based on at least one sensed engagement between the motherboard and chassis, wherein the sensor element is at least one plated through hole that mechanically interacts with structure on the chassis.

13. A tangible computer readable medium bearing instructions executable by a processor for:
establishing at least one form factor-dependent operating parameter in a computer having a chassis and a motherboard based on at least one sensed engagement between the motherboard and chassis, wherein the engagement is at least one optical interaction between the motherboard and chassis.

14. The medium of claim 12, wherein the parameter is a fan speed.

15. The medium of claim 12, wherein the parameter is a particular type of input/output structure and/or protocol.

16. The motherboard of claim 1, wherein the sensor element includes at least one light detector and at least one light emitter and the structure on the computer chassis includes at least one hole and/or void.

17. The motherboard of claim 16, wherein the light emitter is a light emitting diode.

18. The motherboard of claim 16, wherein the light detector is a photoresistor and!or phototransistor.

19. The motherboard of claim 4, wherein each pad is connected to a voltage source through a respective resistor, each pad also being connected to a respective port of an input/output port assembly which is connected to a system bus.

20. The motherboard of claim 4, wherein at least one of the pads mates with an electrically conductive non-round extension on the chassis.

21. The motherboard of claim 20, wherein the extension is oriented as appropriate for a chassis type by a mounting screw with the extension.

* * * * *